US007223967B2

(12) United States Patent
Guevremont et al.

(10) Patent No.: US 7,223,967 B2
(45) Date of Patent: May 29, 2007

(54) SIDE-TO-SIDE FAIMS APPARATUS HAVING AN ANALYZER REGION WITH NON-UNIFORM SPACING AND METHOD THEREFORE

(75) Inventors: Roger Guevremont, Ottawa (CA); Randy Purves, Orleans (CA); David Barnett, Orleans (CA); Mark Weir, Gloucester (CA)

(73) Assignee: Thermo Finnigan LLC, San Jose, CA (US)

(*) Notice: Subject to any disclaimer, the term of this patent is extended or adjusted under 35 U.S.C. 154(b) by 461 days.

(21) Appl. No.: 10/503,656

(22) PCT Filed: Feb. 7, 2003

(86) PCT No.: PCT/CA03/00175

§ 371 (c)(1),
(2), (4) Date: Aug. 6, 2004

(87) PCT Pub. No.: WO03/067243

PCT Pub. Date: Aug. 14, 2003

(65) Prior Publication Data

US 2006/0060773 A1 Mar. 23, 2006

Related U.S. Application Data

(60) Provisional application No. 60/354,711, filed on Feb. 8, 2002.

(51) Int. Cl.
*H01J 49/00* (2006.01)
*B01D 59/44* (2006.01)

(52) U.S. Cl. ...................... 250/288; 250/281; 250/282; 250/286; 250/291

(58) Field of Classification Search ................ 250/288, 250/281, 291, 292, 286, 287
See application file for complete search history.

(56) References Cited

U.S. PATENT DOCUMENTS

| | | | |
|---|---|---|---|
| 5,420,424 | A | 5/1995 | Carnahan et al. |
| 6,504,149 | B2 | 1/2003 | Guevremont et al. |
| 6,621,077 | B1 | 9/2003 | Guevremont et al. |

(Continued)

FOREIGN PATENT DOCUMENTS

| | | |
|---|---|---|
| WO | 03/067625 | 8/2003 |
| WO | 2004/030129 A2 | 4/2004 |

OTHER PUBLICATIONS

Buryakov et al., "A New Method of Separation of Multi-Atomic Ions by Mobility at Atmospheric Pressure using a High-Frequency Amplitude-Asymmetric Strong Electric Field", Int. J. Mass Spectrom. Ion Processes, No. 128, pp. 143-148, (1993), Elsevier Science Publishers B.V.

(Continued)

*Primary Examiner*—David A. Vanore
*Assistant Examiner*—Johnnie L Smith, II
(74) *Attorney, Agent, or Firm*—Freedman & Associates

(57) ABSTRACT

Disclosed is a high field asymmetric waveform ion mobility spectrometer (FAIMS) having a side-to-side electrode geometry. The FAIMS includes an inner electrode (102) having a length and an outer surface that is curved in a direction transverse to the length. The FAIMS also includes an outer electrode (104) having a length, a channel extending therethrough along at least a portion of the length, and a curved inner surface, a portion of the length of the outer electrode overlapping a portion of the length of the inner electrode so as to provide an analyzer region therebetween. The outer electrode has an ion inlet (114) for introducing ions from a source of ions into the analyzer region and an ion outlet (112) for extracting ions from the analyzer region, the ion inlet and the ion outlet being disposed on opposing sides of the outer electrode. The FAIMS is characterized in that at least one of the inner and outer electrodes is shaped such that a width of the analyzer region in the vicinity of the ion outlet is other than a width of the analyzer region in at least one other region.

32 Claims, 11 Drawing Sheets

U.S. PATENT DOCUMENTS

| | | | | |
|---|---|---|---|---|
| 6,653,627 | B2 | 11/2003 | Guevremont et al. | |
| 6,690,004 | B2 | 2/2004 | Miller et al. | |
| 6,713,758 | B2 * | 3/2004 | Guevremont et al. | 250/290 |
| 6,753,522 | B2 * | 6/2004 | Guevremont et al. | 250/287 |
| 6,770,875 | B1 * | 8/2004 | Guevremont et al. | 250/288 |
| 6,987,262 | B2 * | 1/2006 | Guevremont | 250/288 |
| 7,005,633 | B2 * | 2/2006 | Guevremont et al. | 250/287 |
| 7,026,612 | B2 * | 4/2006 | Guevremont et al. | 250/288 |
| 7,034,286 | B2 * | 4/2006 | Guevremont et al. | 250/282 |
| 7,034,289 | B2 * | 4/2006 | Guevremont et al. | 250/288 |
| 7,045,778 | B2 * | 5/2006 | Guevremont et al. | 250/288 |
| 7,112,788 | B2 * | 9/2006 | Guevremont et al. | 250/294 |
| 7,148,474 | B2 * | 12/2006 | Tang et al. | 250/287 |
| 2003/0089847 | A1 | 5/2003 | Guevremont et al. | |
| 2003/0150984 | A1 * | 8/2003 | Guevremont et al. | 250/281 |
| 2003/0150985 | A1 | 8/2003 | Guevremont et al. | |
| 2003/0153087 | A1 * | 8/2003 | Guevremont et al. | 436/86 |
| 2003/0213899 | A9 | 11/2003 | Guevremont et al. | |
| 2003/0226965 | A1 * | 12/2003 | Guevremont et al. | 250/290 |
| 2003/0230711 | A1 * | 12/2003 | Guevremont et al. | 250/287 |
| 2004/0232326 | A1 * | 11/2004 | Guevremont et al. | 250/287 |
| 2005/0116160 | A1 * | 6/2005 | Guevremont | 250/282 |
| 2005/0145789 | A1 * | 7/2005 | Miller et al. | 250/290 |
| 2005/0151072 | A1 * | 7/2005 | Guevremont et al. | 250/282 |
| 2005/0178962 | A1 * | 8/2005 | Guevremont et al. | 250/293 |
| 2005/0178964 | A1 * | 8/2005 | Guevremont et al. | 250/294 |
| 2005/0258359 | A1 * | 11/2005 | Guevremont et al. | 250/288 |
| 2006/0226353 | A1 * | 10/2006 | Tang et al. | 250/287 |

OTHER PUBLICATIONS

Eiceman et al., “Ion Mobility Spectrometry”, (1994), CRC Press, Florida.

E.A. Mason and E.W. McDaniel, *Transport Properties of Ions in Gases* (Wiley, New York, 1988).

Guevremont et al., “Atmospheric Pressure Ion Focusing in a High-Field Asymmetric Waveform Ion Mobility Spectrometer”, Review of Scientific Instruments, vol. 70, No. 2, pp. 1370-1\383, (Feb. 1999), American Institute of Physics.

Guevremont et al. “Atmospheric pressure ion trapping in a tandem FAIMS-FAIMS coupled to a TOFMS: studies with electrospray generated gramicidin S ions”, J. Amer. Soc. Mass Spectrom., 2001, v12, 1320-1330.

* cited by examiner

SIDE-TO-SIDE FAIMS APPARATUS HAVING AN ANALYZER REGION WITH NON-UNIFORM SPACING AND METHOD THEREFORE

This application claims the benefit of U.S. Provisional Application No. 60/354,711, filed Feb. 8, 2002.

FIELD OF THE INVENTION

The instant invention relates generally to high field asymmetric waveform ion mobility spectrometry (FAIMS), more particularly the instant invention relates to side-to-side FAIMS devices having non-uniform inter-electrode spacing.

BACKGROUND OF THE INVENTION

High sensitivity and amenability to miniaturization for field-portable applications have helped to make ion mobility spectrometry (IMS) an important technique for the detection of many compounds, including narcotics, explosives, and chemical warfare agents as described, for example, by G. Eiceman and Z. Karpas in their book entitled "Ion Mobility Spectrometry" (CRC Boca Raton, 1994). In IMS, gas-phase ion mobilities are determined using a drift tube with a constant electric field. Ions are separated in the drift tube on the basis of differences in their drift velocities. At low electric field strength, for example 200 V/cm, the drift velocity of an ion is proportional to the applied electric field strength, and the mobility, K, which is determined from experimentation, is independent of the applied electric field. Additionally, in IMS the ions travel through a bath gas that is at sufficiently high pressure that the ions rapidly reach constant velocity when driven by the force of an electric field that is constant both in time and location. This is to be clearly distinguished from those techniques, most of which are related to mass spectrometry, in which the gas pressure is sufficiently low that, if under the influence of a constant electric field, the ions continue to accelerate.

E. A. Mason and E. W. McDaniel in their book entitled "Transport Properties of Ions in Gases" (Wiley, N.Y., 1988) teach that at high electric field strength, for instance fields stronger than approximately 5,000 V/cm, the ion drift velocity is no longer directly proportional to the applied electric field, and K is better represented by $K_H$, a non-constant high field mobility term. The dependence of $K_H$ on the applied electric field has been the basis for the development of high field asymmetric waveform ion mobility spectrometry (FAIMS). Ions are separation in FAIMS on the basis of a difference in the mobility of an ion at high field strength, $K_H$, relative to the mobility of the ion at low field strength, K. In other words, the ions are separated due to the compound dependent behavior of $K_H$ as a function of the applied electric field strength.

In general, a device for separating ions according to the FAIMS principle has an analyzer region that is defined by a space between first and second spaced-apart electrodes. The first electrode is maintained at a selected dc voltage, often at ground potential, while the second electrode has an asymmetric waveform V(t) applied to it. The asymmetric waveform V(t) is composed of a repeating pattern including a high voltage component, $V_H$, lasting for a short period of time $t_H$ and a lower voltage component, $V_L$, of opposite polarity, lasting a longer period of time $t_L$. The waveform is synthesized such that the integrated voltage-time product, and thus the field-time product, applied to the second electrode during each complete cycle of the waveform is zero, for instance $V_H t_H + V_L t_L = 0$; for example +2000 V for 10 μs followed by −1000 V for 20 μs. The peak voltage during the shorter, high voltage portion of the waveform is called the "dispersion voltage." or DV, which is identically referred to as the applied asymmetric waveform voltage.

Generally, the ions that are to be separated are entrained in a stream of gas flowing through the FAIMS analyzer region, for example between a pair of horizontally oriented, spaced-apart electrodes. Accordingly, the net motion of an ion within the analyzer region is the sum of a horizontal x-axis component due to the stream of gas and a transverse y-axis component due to the applied electric field. During the high voltage portion of the waveform an ion moves with a y-axis velocity component given by $v_H = K_H E_H$, where $E_H$ is the applied field, and $K_H$ is the high field ion mobility under operating electric field, pressure and temperature conditions. The distance traveled by the ion during the high voltage portion of the waveform is given by $d_H = v_H t_H = K_H E_H t_H$, where $t_H$ is the time period of the applied high voltage. During the longer duration, opposite polarity, low voltage portion of the asymmetric waveform, the y-axis velocity component of the ion is $v_L = KE_L$, where K is the low field ion mobility under operating pressure and temperature conditions. The distance traveled is $d_L = v_L t_L = KE_L t_L$. Since the asymmetric waveform ensures that $(V_H t_H) + (V_L t_L) = 0$, the field-time products $E_H t_H$ and $E_L t_L$ are equal in magnitude. Thus, if $K_H$ and K are identical, $d_H$ and $d_L$ are equal, and the ion is returned to its original position along the y-axis during the negative cycle of the waveform. If at $E_H$ the mobility $K_H > K$, the ion experiences a net displacement from its original position relative to the y-axis. For example, if a positive ion travels farther during the positive portion of the waveform, for instance $d_H > d_L$, then the ion migrates away from the second electrode and eventually will be neutralized at the first electrode.

In order to reverse the transverse drift of the positive ion in the above example, a constant negative dc voltage is applied to the second electrode. The difference between the dc voltage that is applied to the first electrode and the dc voltage that is applied to the second electrode is called the "compensation voltage" (CV). The CV voltage prevents the ion from migrating toward either the second or the first electrode. If ions derived from two compounds respond different to the applied high strength electric fields, the ratio of $K_H$ to K may be different for each compound. Consequently, the magnitude of the CV that is necessary to prevent the drift of the ion toward either electrode is also different for each compound. Thus, when a mixture including several species of ions, each with a unique $K_K$/K ratio, is being analyzed by FAIMS, only one species of ion is selectively transmitted to a detector for a given combination of CV and DV. In one type of FAIMS experiment, the applied CV is scanned with time, for instance the CV is slowly ramped or optionally the CV is stepped from one voltage to a next voltage, and a resulting intensity of transmitted ions is measured. In this way a CV spectrum showing the total ion current as a function of CV, is obtained.

Guevremont et al. have described the use of curved electrode bodies for instance inner and outer cylindrical electrodes, for producing a two-dimensional atmospheric pressure ion focusing effect that results in higher ion transmission efficiencies than can be obtained using, for example, a FAIMS device having parallel plate electrodes. In particular, with the application of an appropriate combination of DV and CV an ion of interest is focused into a band-like region in the annular gap between the cylindrical electrodes as a result of the electric fields which change with radial distance. Focusing the ions of interest has the effect of reducing the number of ions of interest that are lost as a result of the ion suffering a collision with one of the inner and outer electrodes. FAIMS devices with cylindrical electrode geometry have been described in the prior art, as for example in U.S. Pat. No. 5,420,424, the contents of which are incorporated herein by reference.

In WO 00/08455, the contents of which are incorporated herein by reference. Guevremont and Purves describe a domed-FAIMS analyzer. In particular, the domed-FAIMS analyzer includes a cylindrical inner electrode having a curved surface terminus proximate an ion outlet orifice of the FAIMS analyzer region. The curved surface terminus is substantially continuous with the cylindrical shape of the inner electrode and is aligned co-axially with the ion outlet orifice. During use, the application of an asymmetric waveform to the inner electrode results in the normal ion-focusing behavior as described above, and in addition the ion-focusing action extends around the generally spherically shaped terminus of the inner electrode. This causes the selectively transmitted ions to be directed generally radially inwardly within the region that is proximate the terminus of the inner electrode. Several contradictory forces are acting on the ions in thus region near the terminus of the inner electrode. The force of the carrier gas flow tends to influence the ions to travel towards the ion-outlet orifice, which advantageously also prevents the ions from migrating in a reverse direction, back towards the ion source. Additionally, the ions that get too close to the inner electrode are pushed back away from the inner electrode, and those near the outer electrode migrate back towards the inner electrode, due to the focusing action of the applied electric fields. When all forces acting upon the ions are balanced, the ions are effectively captured in every direction, either by forces of the flowing gas, or by the focusing effect of the electric fields of the FAIMS mechanism. This is an example of a three-dimensional atmospheric pressure ion trap, as described in greater detail by Guevremont and Purves in WO 00/08457, the contents of which are incorporated herein by reference.

Guevremont and Purves further disclose a near-trapping mode of operation for the above-mentioned domed-FAIMS analyzer, which achieves ion transmission from the domed-FAIMS to a mass spectrometer with high efficiency. Under near-trapping conditions, the ions that accumulate in the three-dimensional region of space near the spherical terminus of the inner electrode are caused to leak from this region, being pulled by a flow of gas towards the ion-outlet orifice. The ions that are extracted from this region do so as a narrow, approximately collimated beam, which is pulled by the gas flow through the ion-outlet orifice and into a smaller orifice leading into the vacuum system of the mass spectrometer. Accordingly, a tandem domed-FAIMS/MS device is a highly sensitive instrument that is capable of detecting and identifying ions of interest at part-per-billion levels.

More recently, in WO 01/69216 the contents of which is incorporated herein by reference, Guevremont and Purves describe a so-called "perpendicular-gas-flow-FAIMS", which is identically referred to as a side-to-side FAIMS. The analyzer region of the side-to-side FAIMS is defined by an annular space between inner and outer cylindrical electrodes. In particular, ions that are introduced into the analyzer region of the side-to-side FAIMS are selectively transmitted in a direction that is generally around the circumference of the inner electrode. For instance, the ion inlet and the ion outlet of a side-to-side FAIMS device are disposed, one opposing the other, within a surface of the outer electrode such that ions are selectively transmitted through the curved analyzer region between the ion inlet and the ion outlet along a continuously curving ion flow path absent a portion having a substantially linear component. In particular, the ions travel from the ion inlet to the ion outlet by flowing around the inner electrode in one of a "clockwise" and a "counter clock-wise" direction. This is in contrast to the above-mentioned FAIMS devices in which the ions are selectively transmitted along the length of the inner electrode.

Advantageously, the side-to-side FAIMS device reduces the minimum distance that must be traveled by the ions within the analyzer region to approximately fifty per cent of the circumference of the inner electrode. Since the ions split into two streams traveling in opposite directions around the inner electrode after they are introduced through the ion inlet, the effective ion density within the analyzer region is reduced, and so too is the ion-ion repulsion space charge effect reduced. Furthermore, the reduction of the minimum ion travel distance has the added benefit of improving the ion transmission efficiency. For example, by keeping the time for travel short, the effect of diffusion and ion-ion repulsion forces are minimized. In keeping distances short, the transit time of the ions through the analyzer region is also short, which supports more rapid analysis of ion mixtures.

The side-to-side electrode geometry is readily adapted for use with a conventional electrospray ionization source. It has been determined experimentally that the analysis of peptides and proteins using mode P2, that is fir positive ions using a negative DV, gave results comparable to those obtained using a domed-FAIMS device. It is a limitation of the side-to-side FAIMS, however, that the analysis of several low molecular weight species, that is a molecular weight of less than approximately 200–300 Da, using mode N1, that is for negative ions using a negative DV, resulted in a lower signal intensity compared to the results that were obtained using the domed-FAIMS device. This result was not entirely unexpected, in view of the specific steps that are performed for optimizing the performance of a domed-FAIMS device. In particular, the distance between the hemispherical tip of the inner electrode and the ion outlet, referred to as the extraction region, is adjusted so as to optimize signal intensity. For the domed-device, in general, the distance is slightly larger for peptides and proteins than it is for the low molecular weight species. Furthermore, when using mode N1, optimal results are obtained when the distance between the inner and outer electrodes is less in the extraction region than it is in the remainder of the analyzer region.

Of course, it is relatively straightforward to vary the inter-electrode spacing in extraction region of the domed-FAIMS devices. For example, this optimization is easily achieved in the domed-FAIMS devices by relatively moving the inner electrode toward the ion outlet in the outer electrode, which affects only the spacing near the ion outlet. In particular, the analyzer region of a domed-FAIMS device is defined between the cylindrical inner surface of the outer electrode and the cylindrical outer surface of the inner electrode. Accordingly, the inter-electrode spacing, and therefore the conditions for selectively transmitting ions, does not change within the analyzer region of a domed-FAIMS device when the inner electrode is moved in a longitudinal direction relative to the outer electrode. As will be obvious to one of skill in the art, such is not the case for a FAIMS having a side-to-side electrode geometry. In particular, relatively moving the inner electrode toward the ion outlet in the outer electrode of a side-to-side FAIMS results not only in changes to the inter-electrode spacing proximate the ion outlet, but also elsewhere in the analyzer region. By making such an adjustment, the overall ion transmission efficiency through the side-to-side FAIMS device is likely to be lower, since the resulting changes in electric fields within the analyzer region are likely to cause a disproportionate increase in ion losses.

It would be advantageous to provide a FAIMS apparatus including a detection system that overcomes the limitations of the prior art.

SUMMARY OF THE INVENTION

In accordance with an aspect of the instant invention there is provided a high field asymmetric waveform ion mobility spectrometer having a side-to-side electrode geometry, comprising an inner electrode having a length and an outer surface that is curved in a direction transverse to the length, and, an outer electrode having a length, a channel extending therethrough along at least a portion of the length, and a curved inner surface, a portion of the length of the outer electrode overlapping a portion of, the length of the inner electrode so as to provide an analyzer region therebetween, the outer electrode including an ion inlet for introducing ions from a source of ions into the analyzer region and an ion outlet for extracting ions from the analyzer region, the ion inlet and the ion outlet disposed on opposing sides of the outer electrode, characterized in that at least one of the inner and outer electrodes is shaped such that a width of the analyzer region in the vicinity of the ion outlet is other than a width of the analyzer region in at least one other region.

In accordance with an aspect of the instant invention there is provided a high field asymmetric waveform ion mobility spectrometer having a side-to-side electrode geometry, comprising an outer electrode having a length and an inner surface that is curved in a direction transverse to the length, the outer electrode including an ion inlet within a first portion of the inner surface and an ion outlet within a second portion of the inner surface that is opposite the first portion of the inner surface, and, an eccentric inner electrode rotatably mounted in a spaced-apart arrangement with the outer electrode and defining an analyzer region therebetween, the inner electrode rotatable between a first position for providing a first width of the analyzer region in the vicinity of the ion outlet and a second position for providing a second width of the analyzer region in the vicinity of the ion outlet, the second width shorter than the first width.

In accordance with another aspect of the instant invention there is provided a method for separating ions, the method comprising the steps of providing a FAIMS analyzer region having a side-to-side geometry, the analyzer region dispensed between an outer electrode and an inner electrode, the outer electrode having an ion inlet and an ion outlet, a radial distance between the ion outlet and an outer surface of the inner electrode being other than a radial distance between an inner surface of the outer electrode and the outer surface of the inner electrode in a region away from the ion outlet; introducing ions from a source of ions into the analyzer region via the ion inlet transmitting at least some of the ions through the analyzer region between the ion inlet and the ion outlet at a given combination of an applied asymmetric waveform and an applied compensation voltage, and, extracting the transmitted ions from the analyzer region through the ion outlet.

In accordance with another aspect of the instant invention there is provided a method of separation ions, the method comprising the steps of providing a FAIMS analyzer region having a side-to-side geometry, the analyzer region disposed between an outer electrode and an inner electrode, the outer electrode having an ion inlet and an ion outlet; varying a spacing between the ion outlet and the inner electrode; introducing ions from a source of ions into the analyzer region via the ion inlet; transmitting at least some of the ions through the analyzer region between the ion inlet and the ion outlet at a given combination of an applied asymmetric waveform and an applied compression voltage; and, extracting the transmitted ions from the analyzer region through the ion outlet.

In accordance with yet another aspect of the instant invention there is provided an apparatus for separating ions comprising a high field asymmetric waveform ion mobility spectrometer comprising an inner electrode having a length and a curved outer surface, and an outer electrode having a length, a channel extending therethrough along at least a portion of the length, and a carved inner surface, a portion of the length of the outer electrode overlapping a portion of the length of the inner electrode so as to provide an analyzer region therebetween, the outer electrode defining an ion inlet and an ion outlet, the ion outlet disposed in a spaced-apart facing arrangement with a portion of the curved outer surface of the inner electrode, the ion outlet recessed within the curved inner surface of the outer electrode, such that a spacing between the portion of the curved outer surface and the ion outlet is longer than a spacing between a different portion of the curved outer surface and the curved inner surface of the outer electrode in a region away from the ion outlet.

BRIEF DESCRIPTION OF THE DRAWINGS

Exemplary embodiments of the invention will now be described in conjunction with the following drawings, in which similar reference numbers designate similar items.

DETAILED DESCRIPTION OF THE DRAWINGS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1A:
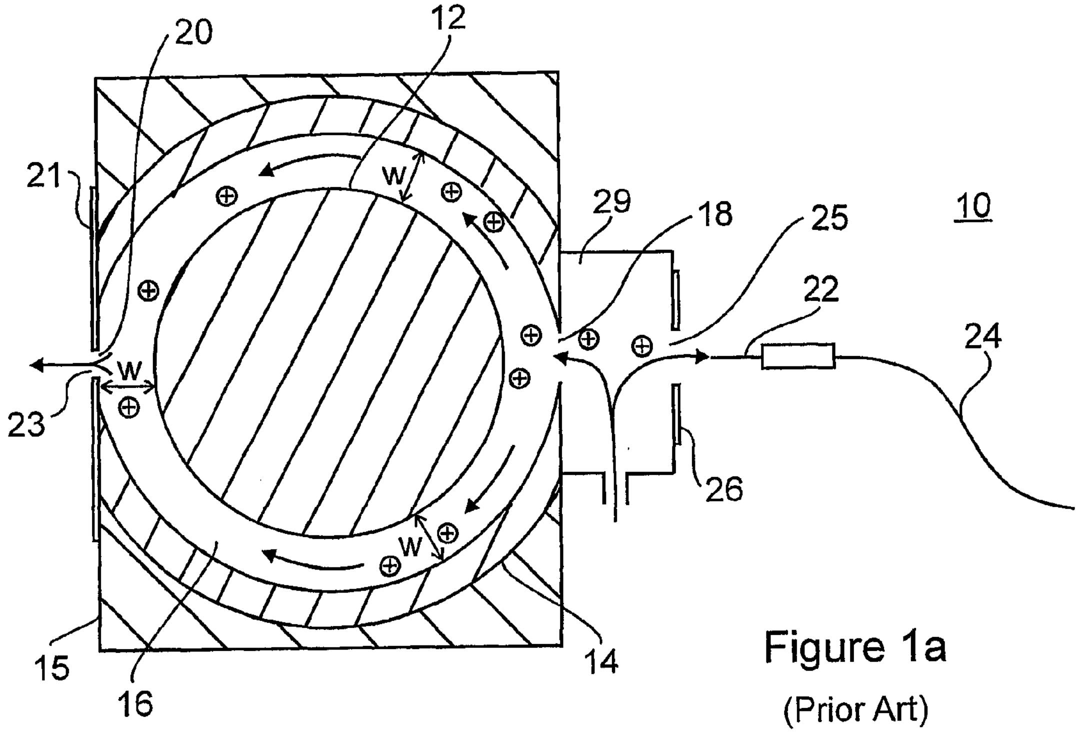
Figure 1a (Prior Art)
FIG. 1*a* is an end cross sectional view of a prior art side-to-side FAIMS.

Referring to FIG. 1*a*, shown is an end cross sectional view of a prior art side-to-side FAIMS. The side-to-side FAIMS device shown generally at 10, includes inner and outer generally cylindrical electrodes 12 and 14, respectively, which are supported by an electrically insulating material 15 in an overlapping, spaced-apart arrangement. The generally annular space between the inner electrode 12 and the outer electrode 14 defines a FAIMS analyzer region 16. The analyzer region 16 is of approximately uniform width and extends around the circumference of the inner electrode 12. The inner electrode 12 is an electrical communication with a power supply (not shown) that during use is capable of applying a high voltage asymmetric waveform (DV) and a low voltage dc compensation voltage (CV) to the inner electrode 12.

An ion inlet 18 is provided through the outer electrode 14 for introducing ions from an ion source into the analyzer region 16. For example, the ion source is in the form of an electrospray ionization ion source including a liquid delivery capillary 24, a fine-tipped electrospray needle 22 that is held at high voltage (power supply not shown), and a curtain plate 26 serving as a counter-electrode for the electrospray needle 22. An orifice 25 within the curtain plate 26 allows for transmission of ions produced at the electrospray needle 22 into a separate chamber 29. A flow of a carrier gas, which is represented in FIG. 1*a* by a series of closed-headed arrows, is provided through the separate chamber 29 and within the analyzer region 16, to carry the ions around the inner electrode 12 and toward an ion outlet 20. The orifice 25 within the curtain plate 26 allows for the flow of a portion of the carrier gas in a direction that is counter-current to the direction in which the ions are traveling near the ion inlet 18, so as to desolvate the ions before they are introduced into the analyzer region 16.

The ion outlet 20 is formed preferably by removing of some of the electrically insulating material 15 and some of the outer electrode 14, to create a narrow opening that serves as the ion outlet 20. An outlet plate 21 having an orifice 23 therethrough is sealed gas tight against the outer electrode 14 and the insulating material proximate the ion outlet 20, such that the ion outlet 20 and the orifice 23 through the outlet plate 21 are approximately aligned. The outlet plate 21 substantially closes the opening that is created by removal of some of the outer electrode 14, except for a portion of the opening adjacent to the orifice 23. Advantageously, the outer plate 21 is held at a same potential as the outer electrode 14, such that the electric fields in the vicinity of the ion outlet 20 are not substantially affected by the presence of the orifice 20.

Upon entering the FAIMS analyzer region 16 via the ion inlet 18, ions are carried through an electric field that is formed within the FAIMS analyzer region 16 as a result of the application of the asymmetric waveform and the CV to the inner electrode 12. Ion separation occurs within the FAIMS analyzer region 16 on the basis of the high field mobility properties of the ions. Those ions that have a stable trajectory for a particular combination of DV and CV are selectively transmitted through the FAIMS analyzer region 16, whilst other ions of the mixture collide with an electrode surface and are lost. The selectively transmitted ions are extracted from the analyzer region 16 via ion outlet 20 and are typically subjected to one of detection and further analysis.

Referring still to FIG. 1*a*, the outer electrode 14 has a length, a channel extending through at least a portion of the length, and an inner surface that is curved in a direction transverse to the length. The inner surface is approximately continuous in the curved direction, being non-continuous only in the vicinities of the ion inlet 18 and of the ion outlet 20. In the FAIMS device 10, an approximately uniform spacing w, is maintained within the analyzer region 16 between the inner electrode 12 and the inner surface the outer electrode 14. The spacing, w, also referred to as the width of the analyzer region, is measured in a radial direction between the inner electrode 12 and the inner surface the outer electrode 14. However, proximate the ion outlet 20 the inner surface of the outer electrode 14 is absent, having been removed in order to form the ion outlet 20. The outlet plate 21 is provided in order to approximately maintain a same spacing, w, of the width of the analyzer region in the vicinity of the ion outlet 20. Approximately maintaining a same spacing, w, in the vicinity of the ion outlet 20 ensures that the electric fields within the devices are substantially uniform throughout the analyzer region 16. Accordingly, ions that are introduced into the analyzer region 16 via the ion inlet 18 experience similar electric fields during selective transmission through the analyzer region, and during extraction from the analyzer region via the ion outlet 20.

As discussed supra, certain types of ions are expected to be extracted from the analyzer region with higher efficiency when the spacing between the inner electrode 12 and the ion outlet 20, or more correctly the orifice 23 in the outlet plate 21, is smaller than the inter-electrode spacing, w, within the remainder of the analyzer region 16. In particular, observations made using domed-FAIMS devices show that low molecular weight ions are extracted with higher efficiency when an inner electrode of the domed-FAIMS device is moved relatively in a direction that is longitudinally toward an ion outlet of the device. Accordingly, the width of an extraction region, $w_d$, in the domed-FAIMS device is an adjustable parameter. Unfortunately, the value of the spacing, w, is not an adjustable parameter of the prior art side-to-side FAIMS 10. As a result of this limitation, the signal intensity of some types of ion is likely not optimized in the FAIMS 10.

Figure 1B:
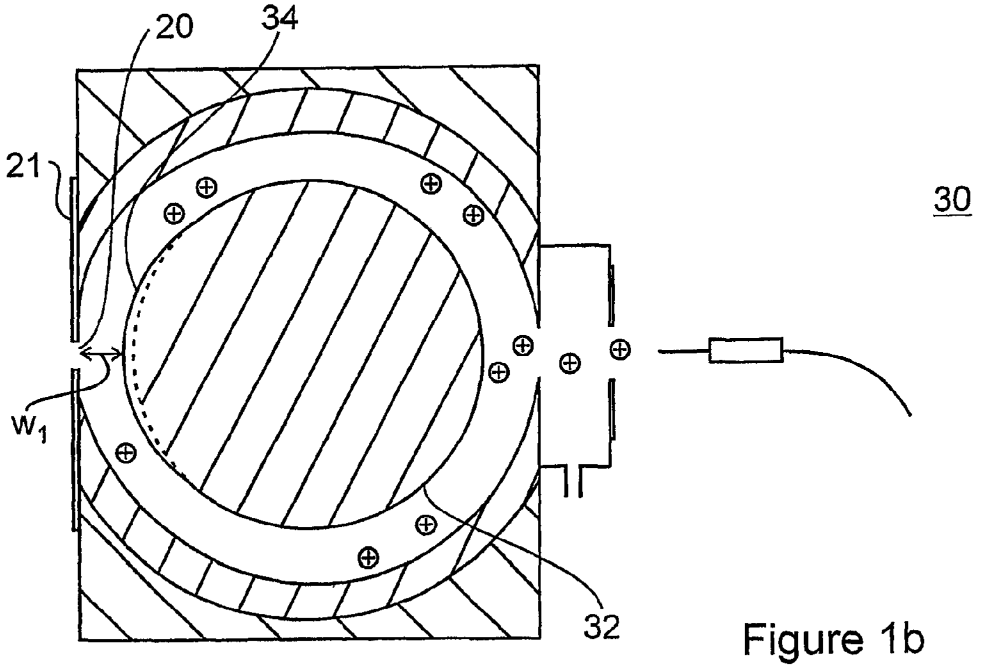
FIG. 1*b* is an end cross sectional view of a side-to-side FAIMS having a modified inner electrode according to the instant invention.

Referring now to FIG. 1*b*, shown is an end cross sectional view of a side-to-side FAIMS having a modified inner electrode according to the instant invention. Elements labeled with the same numerals have the same function as those illustrated in FIG. 1*a*. In particular, the FAIMS 30 includes an inner electrode 32 having a length and having other than a circular periphery in a cross section taken in a plane normal to the length. For example, the inner electrode 32 is shaped such that a spacing, $w_1$, between an edge portion 34 of the inner electrode 32 and the outlet plate 21 is smaller than a space, w, between the inner electrode 32 and the outer electrode 14 within the remainder of the analyzer region. As a result, the spacing $w_1$ is approximately permanently adjusted to a value that is smaller than w. Accordingly, the FAIMS 30 is "optimized" for transmitting certain ions, for instance, ions of low molecular weight. Of course, by permanently optimizing the FAIMS 30 for improving extraction efficiency for low molecular weight ions, the usefulness of the FAIMS 30 for analyzing, for example, peptide and/or protein molecules is diminished.

Referring still to FIG. 1*b*, the dashed line illustrates schematically the limit of the prior art inner electrode 12, in order to show that the modified inner electrode 32 of FAIMS 30 affects the inter-electrode spacing most significantly within the vicinity of the ion outlet 20. Minimal or no change is the width of the remainder of the analyzer region is effected in the apparatus that is shown at FIG. 1*b*. Consequently for analyzing low molecular weight ions, the desirable condition of having the width between the inner and outer electrodes smaller in the extraction region that is in the remainder of the analyzer region is achieved.

Figure 1C:
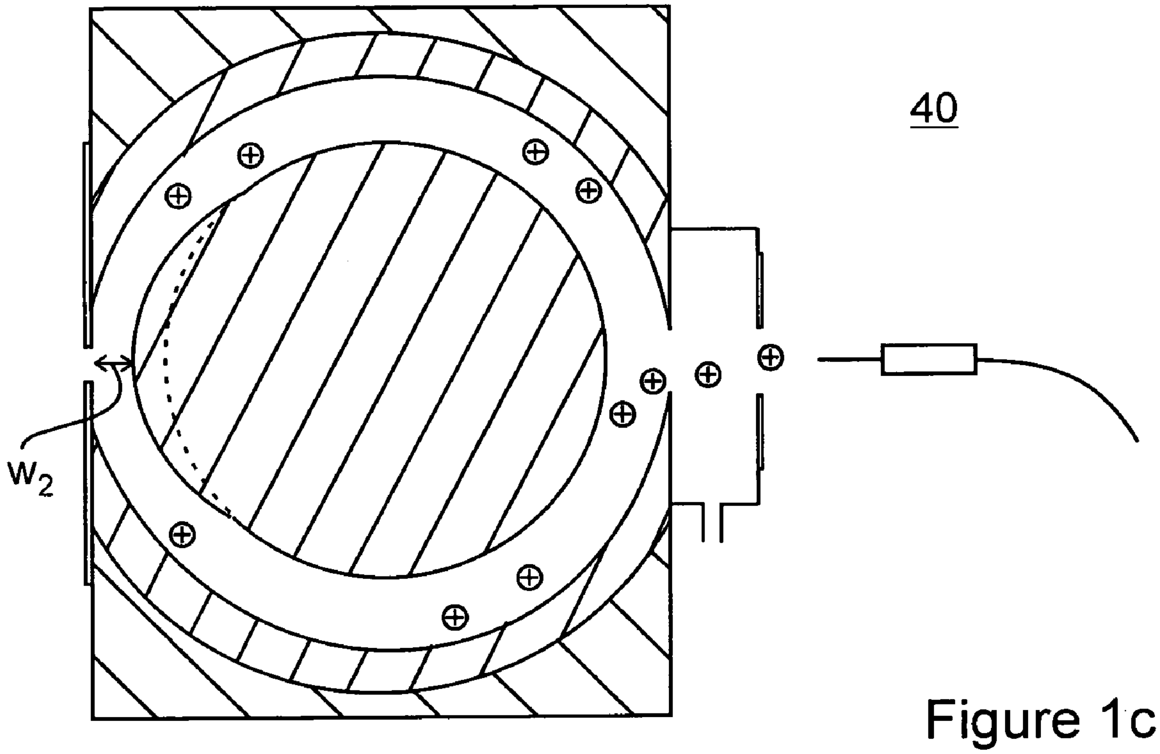
FIG. 1*c* is an end cross sectional view of another side-to-side FAIMS having a modified inner electrode according to the instant invention.

Further decreasing the width of the inter-electrode spacing proximate the ion outlet 20, as shown for example in FIG. 1*c*, results in a condition that does not favor transmission of ions through the device. In fact, if the value of $w_2$ is smaller than a threshold value, then approximately none of the ions are transmitted through the FAIMS device that is shown generally at 40.

Preferably, a plurality of inner electrodes is manufactured, each inner electrode of the plurality of inner electrodes for providing a different spacing between the inner electrode and the outlet plate 21 when the FAIMS device is an assembled condition. To optimize signal intensity, different inner electrodes of the plurality of inner electrodes are tested using a same FAIMS device. For example, one method that enables the same FAIMS device to be used for testing involves shaping test versions of the inner electrodes to be cylindrical, with a same diameter, at both ends of the inner electrode that insert into the insulating material. The optimum value of the spacing, $w_1$, is expected to be compound dependent.

Figure 2:
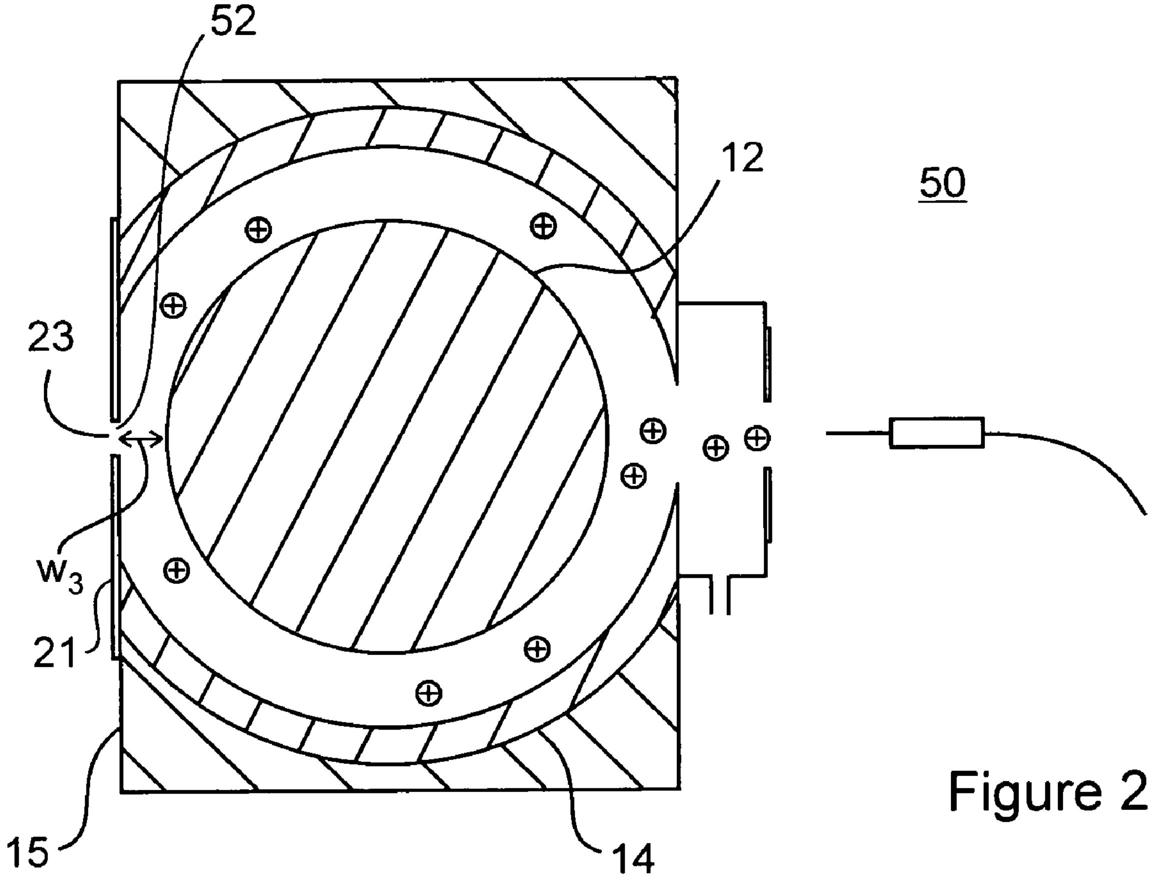
FIG. 2 is an end cross sectional view of a side-to-side FAIMS having a modified outer electrode according to the instant invention.

Referring now to FIG. 2, shown is an end cross sectional view of a side-to-side FAIMS 50 having a modified outer electrode according to the instant invention. Elements labeled with the same numerals have the same function as those illustrated in FIG. 1*a*. In the FAIMS 50, relatively more of the electrically insulating material 15 and of the outer electrode 14 are removed to form the ion outlet 52 than was removed to form the ion outlet 20 of the prior art device 10 of FIG. 1*a*. Accordingly, a size of the ion outlet 52 is greater than a size of the ion outlet 20. Furthermore, when the outlet plate 21 is sealed gas tight against the outer electrode 14 and the insulating material 15, a distance, $w_3$, between the inner electrode 12 and the outlet plate 21 is smaller than the distance, w, in the prior art device 10. Of course, the electric fields in the vicinity of the ion outlet 52 of device 50 are expected to be somewhat distorted relative to the electric fields in the device 10, since a greater portion of the flat inner surface of the outlet plate 21 opposes the inner electrode 12.

The optimum value of the spacing, $w_3$, is expected to be compound dependent. In addition, the optimum value of the spacing $w_3$ for the embodiment shown at FIG. 2 may not be a same value as the value of the spacing $w_1$ for the embodiment shown at FIG. 1*b* because of the differences in the geometries of the electrodes near the orifice 23 in the orifice plate 21.

Figure 3:
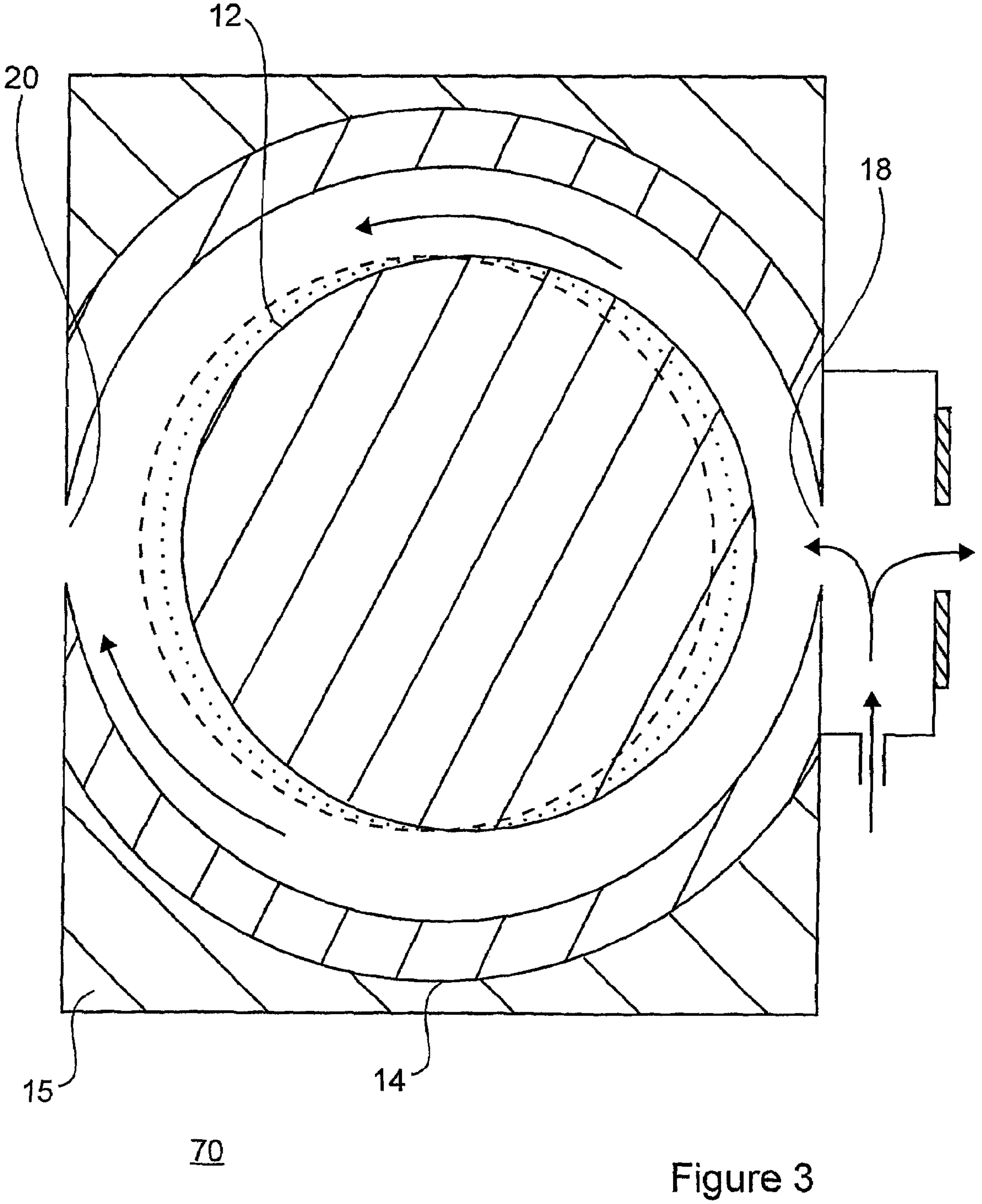
FIG. 3 is an end cross sectional view of a side-to-side FAIMS including a translatable inner electrode according to the instant invention.

Referring now to FIG. 3, shown in an end cross sectional view of another side-to-side FAIMS including a translatable inner electrode according to the instant invention. Elements labeled with the same numerals have the same function as those illustrated in FIG. 1*a*. The generally cylindrical inner electrode 12 is held in place by the insulating material 15. The solid line indicates a configuration identical to that of the prior art device 10 shown at FIG. 1*a*, in which the centers of the inner electrode 12 and the outer electrode 14 are aligned. In the device shown generally at 70, the insulating material is adapted to support relative movement of the inner electrode 12 to the outer electrode 14. For example, the inner electrode 12 is moveable toward the ion outlet along an axis that intersects the center of the ion inlet 18 and ion outlet 20. To this end, a not illustrated mechanism is provided for relatively moving the inner electrode 12 to the outer electrode 14 in one of an automated, a semi-automated, and a manual fashion. Advantageously, the width of the extraction region is adjustable in the device 70 without having to remove and replace any components, such as for example of the inner electrode 12. It is a further advantage of the device 70 that optimization of the inter-electrode spacing proximate the ion outlet 20 does not require fabrication and testing of multiple FAIMS devices and/or components, so as to empirically determine the optimum spacing for a particular type of analyte molecule. The main disadvantage of the embodiment shown in FIG. 3 is that translation of the inner electrode 12 towards or away from the ion outlet 20 has the unwanted effect of the changing width of the analyzer region elsewhere in the device 70, and not just in the vicinity of the ion outlet 20. Consequently, the distance that the inner electrode can be translated before the variations of the width of the analyzer region become too large for the ions to be successfully transmitted is limited. Another factor in the distance that the inner electrode can be translated is the radii of the inner and outer electrode. The use of larger radii electrodes provides improved peak separation capability, that is greater ion selectivity, compared with smaller radii electrodes. Therefore, the distance that the inner electrode of a FAIMS device with larger radii electrodes could be translated may be significantly less than the distance that the inner electrode of a FAIMS device with smaller radii electrodes could be translated before the device would fail.

In addition, when analyzing larger molecular weight species using the device 70, as the inner electrode is increasingly offset toward the ion outlet, the peak width for a given ion in a CV spectrum is expected to decrease and the observed signal intensity may also decrease. For the lower molecular weight species, an initial improvement in the observed intensity is expected as the inner electrode is moved progressively closer to the ion outlet. Eventually, as the inter-electrode distance proximate the ion outlet 20 is further decreased, the observed intensity is expected to decrease dramatically due to larger ion losses as a result of the effect of the non-uniformity of the width of the analyzer region on the electric fields in the extraction region.

Figure 4A:
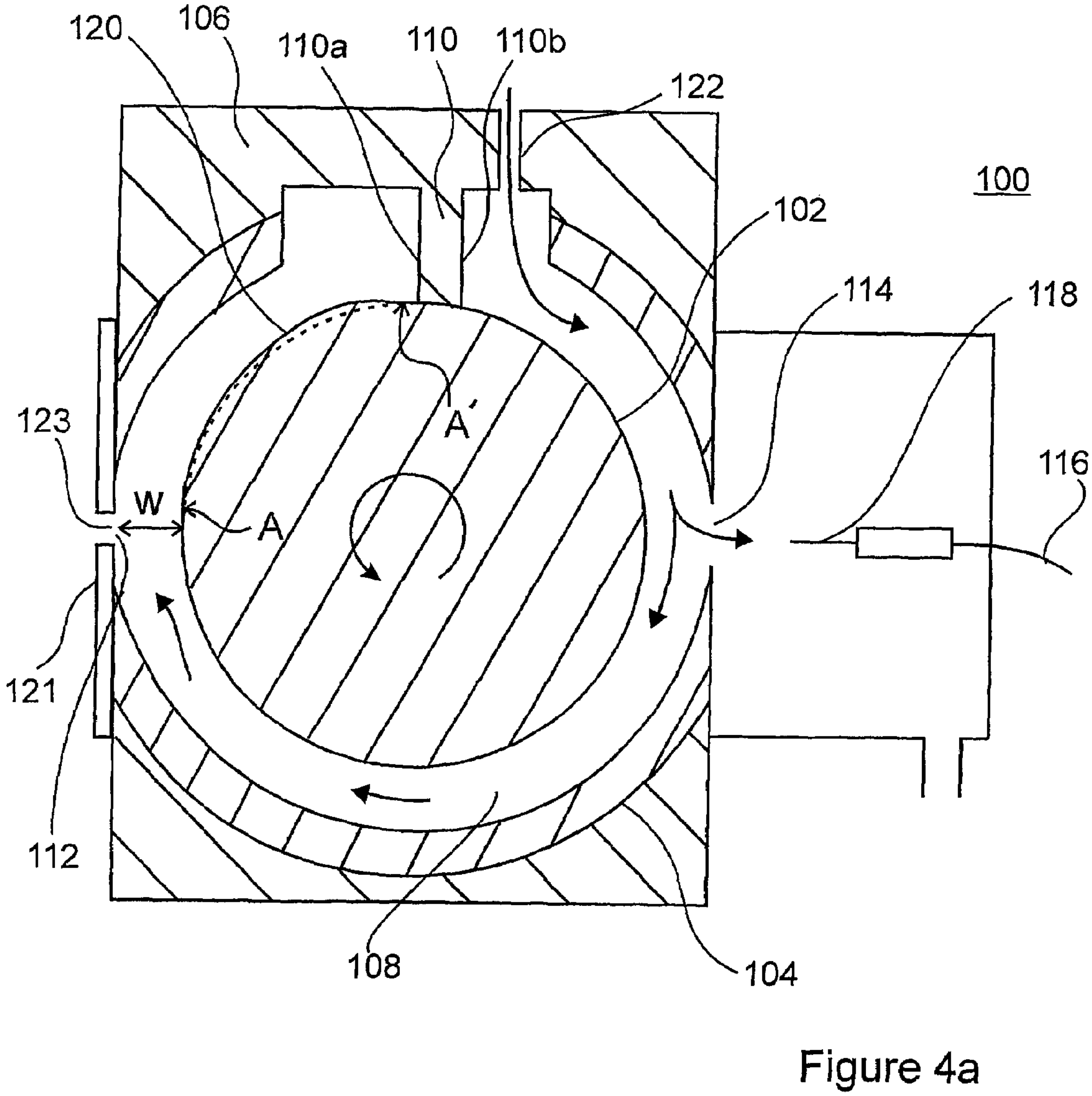
FIG. 4*a* is an end cross sectional view of a side-to-side FAIMS including a rotatable inner electrode according to the instant invention, the rotatable inner electrode shown in a first operating position.

Referring now to FIG. 4*a*, shown is an end cross sectional view of yet another side-to-side FAIMS including a rotatable inner electrode according to the instant invention. The FAIMS 100 includes inner and outer generally cylindrical electrodes 102 and 104, respectively, which are supported by an electrically insulating material 106 in an overlapping, spaced apart arrangement. The inner electrode 102 is in electrical communication with a power supply (not shown) that during use is capable of applying a high voltage asymmetric waveform (DV) and a low voltage dc compensation voltage (CV) to the inner electrode 102. A not illustrated mechanism is provided for rotating the inner electrode 102 relative to the outer electrode 104 in one of an automated, a semi-automated, and a manual fashion.

The general annular space between the inner electrode 102 and the outer electrode 104 defines a FAIMS analyzer region 108. In the device 100, a protrusion 110 of the insulating material 106 extends through an opening in the outer electrode in a direction that is toward the inner electrode 102. The protrusion 110 forms an approximately gas tight seal with the inner electrode 102, thereby forcing a gas flow, which is represented in the figure by a series of closed headed arrows, around one side of the inner electrode 102 toward an ion outlet 112. Preferably, the designs of parts such as for instance the opening in the outer electrode and the protrusion 110 avoid, or at least minimize, the occurrences of electrical discharges.

The ion outlet 112 is formed preferably by removing of some of the electrically insulating material 106 and some of the outer electrode 104, to create a narrow opening that serves as the ion outlet 112. An outlet plate 121 having an orifice 123 therethrough is sealed gas tight against the outer electrode 104 and the insulating material proximate the ion outlet 112, such that the ion outlet 112 and the orifice 123 through the outlet plate 121 are approximately aligned. The outer plate 121 substantially closes the opening that is created by removal of some of the outer electrode 104, except for a portion of the opening adjacent to the orifice 123. Advantageously, the outlet plate 121 is held at a same potential as the outer electrode 104, such that the electric fields in the vicinity of the ion outlet 112 are not substantially affected by the removal of some of the outer electrode 104.

Furthermore, an ion inlet 114 is provided through the outer electrode 104 for introducing ions from an ion source into the analyzer region 108. The ion source is, for example, in the form of an electrospray ionization (ESI) source including a liquid delivery capillary 116 and a fine-tipped electrospray needle 118 that is held at high voltage. The outer electrode 104 in the vicinity of the ion inlet 114 serves as the counter electrode of the electrospray needle 118. Ions that are introduced into the analyzer region 108 become entrained in a carrier gas flow and are transported through the analyzer region 108 between the ion inlet 114 and the ion outlet 112. Only those ions having appropriate mobility properties for a particular combination of applied CV and DV are transmitted to the ion outlet 112 and are extracted from the device 100 by the flow of carrier gas.

Referring still to FIG. 4*a*, the FAIMS device 100 is shown in a first operating mode. In particular, the rotatable inner electrode 102 is in a fully clock-wise rotated position. In the fully clock-wise rotated position a point A' along the circumference of the inner electrode 102 is approximately adjacent to an ion-outlet side 110*a* of the protrusion 110. A portion of the circumference of the inner electrode is defined by the outer surface spanning in a clockwise direction from the first named point on the circumference to the second named point on the circumference. The inner electrode 102 is modified along a portion 102 of the circumference thereof between another point A and point A'. In particular, along the portion of the circumference between the points A' and A, the inner electrode 102 is substantially circular in the cross-sectional view of FIG. 4*a*. Accordingly, an approximately uniform spacing, w, is maintained between the inner and outer electrodes, 102 and 104, respectively, outside of the modified portion 120. Within the modified portion 120, the curve of the inner electrode does not continue along the circular path of the remainder of the inner electrode, which is shown as a dotted line adjacent to the modified portion 120. For example, beginning at point A and moving in a clock-wise direction around the inner electrode 102 the outer surface of the inner electrode 102 deviates outwardly from the circular path, reaching a maximum deviation at a given point that is between the points A and A', and then returning to the circular path at point A'. Preferably, the maximum deviation is at a point that is relatively closer to the point A' than to the point A. Of course, further rotation of the inner electrode beyond the fully clock-wise rotated position is prevented by the protrusion 110, which stops the modified portion 120 of the inner electrode from moving any farther. In addition, the modified portion 120 is shaped so as to avoid or at least minimize the occurrences of electrical discharge between the modified portion 120 and another conductive surface.

The inner electrode 102 is rotated into the fully clock-wise rotated position when, for example, ions of one of a protein and a peptide are to be analyzed. In the fully clock-wise rotated position, the spacing, w, between the inner electrode 102 and the outlet plate 121 is maximized. The spacing, w, proximate the ion outlet 112 is substantially identical to a spacing between the inner electrode 102 and the outer electrode 104 within other portions of the analyzer region 108. Accordingly, the device 100 shown at FIG. 4*a* is optimizable for analyzing ions of different molecular weight.

Figure 4B:
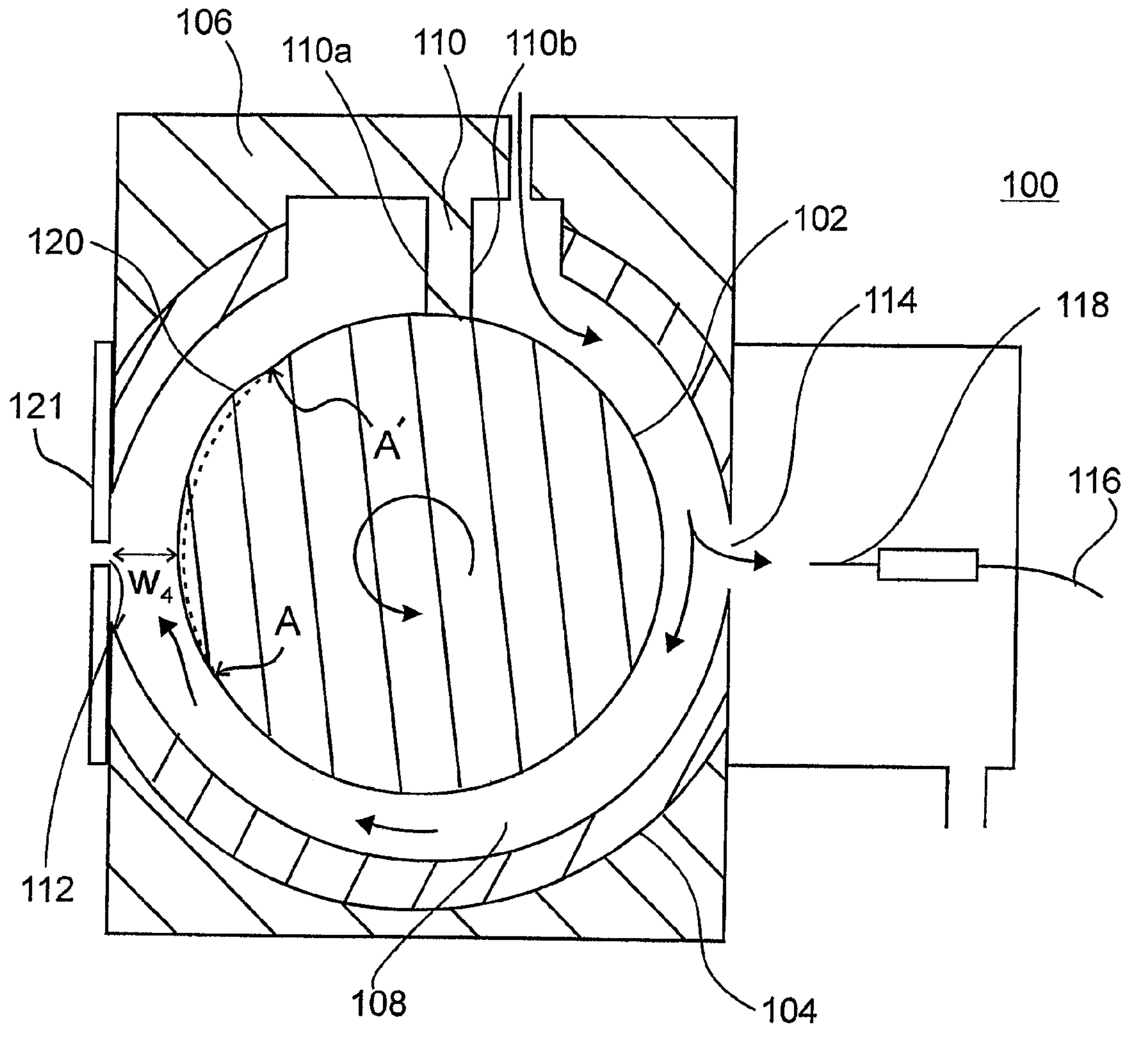
FIG. 4*b* is an end cross sectional view of the side-to-side FAIMS of FIG. 4*a*, the rotatable inner electrode shown in a second operating position.

Referring now to FIG. 4*b*, shown is the device 100 in a second operating mode. Elements labeled with the same numerals have the same function as those illustrated in FIG. 4*a*. In order to tune the spacing between the inner electrode 102 and the outlet plate 121 in the device 100, the inner electrode 102 is rotated part of the way in a counter-clockwise direction, as is shown in FIG. 4*b*. Accordingly, the modified portion 120 of the inner electrode 102 is moved into a position facing the ion outlet 112, such that the spacing between the inner electrode 102 and the outlet plate 121 is reduced to a smaller value, $w_4$. Advantageously, the spacing is reduced proximate the ion outlet 112, with only a very small concomitant change to the spacing throughout the remainder of the device 100. In fact, the spacing between the inner electrode 102 and the outer electrode 104 remains constant, at a value w, between the ion inlet 114 and the point A along the circumference of the inner electrode 102. Although the point A is located within the analyzer region 108, the effect on the electric fields is expected to be minimal since the change in inter-electrode spacing is small. Furthermore, if the ion intensity decreases unacceptably the device may be further tuned by rotating the inner electrode slightly in the clock-wise direction.

Figure 4C:
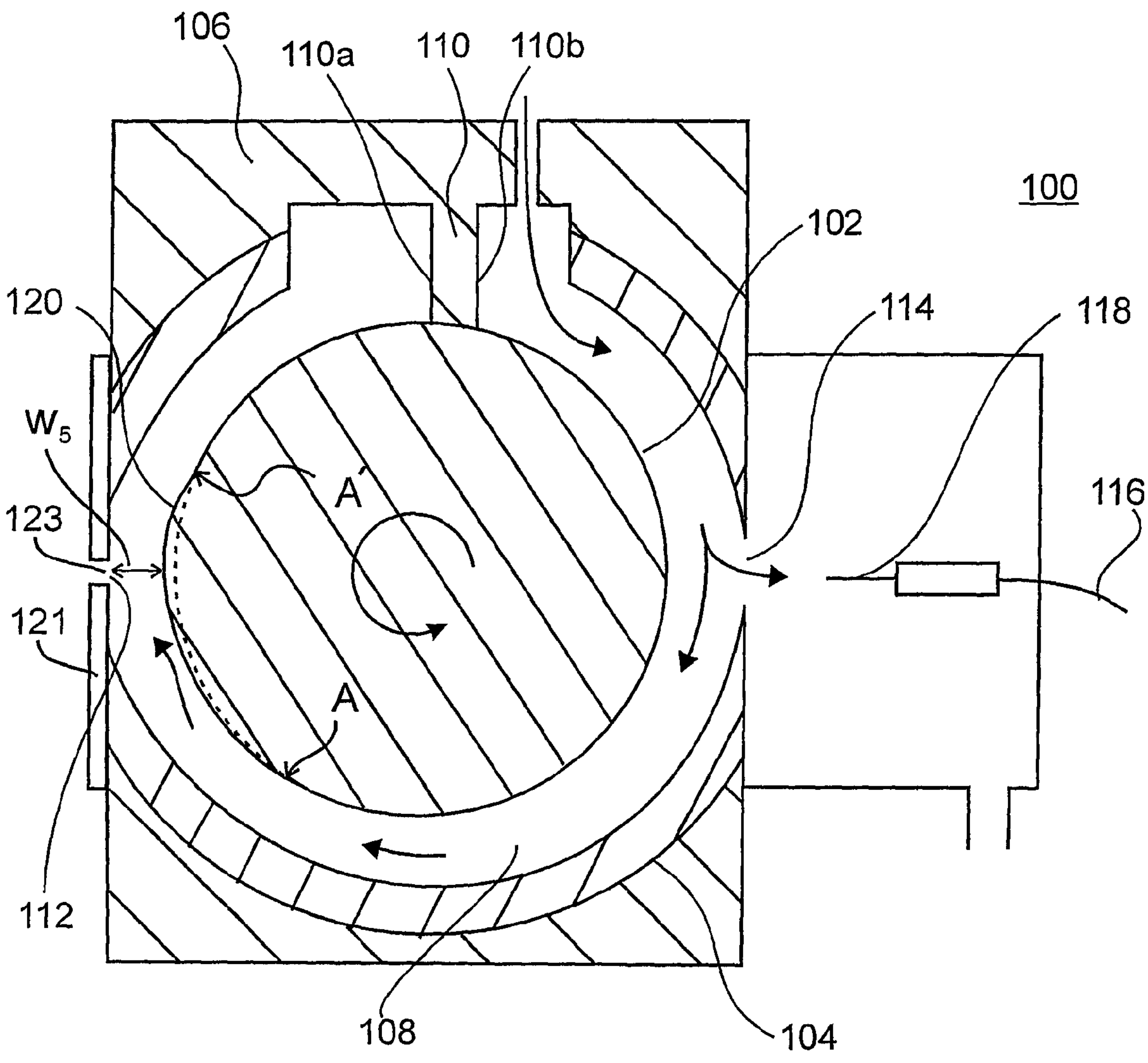
FIG. 4*c* is an end cross sectional view of the side-to-side FAIMS of FIG. 4*a*, the rotatable inner electrode shown in a third opening position.

Referring now to FIG. 4*c*, shown is the device 100 in a third operating mode. Elements labeled with the same numerals have the same function as those illustrated in FIG. 4*a*. In the third operating mode the inner electrode 102 is rotated into a fully counter clock-wise position, defined as the position where the spacing between the inner electrode and the outlet plate 121 is at a minimum attainable value, $w_5$. In other words, the point of maximum deviation along the modified portion 120 is aligned with the orifice 123 through the outlet plate 121. In this third opening mode, the point A extends a maximum distance into the analyzer region 108, and thus the electric fields within the analyzer region 108 are affected to a maximum extent. However, the inter-electrode separation within the analyzer region 108 between the ion inlet 114 and the point A remains unchanged.

Figure 4D:
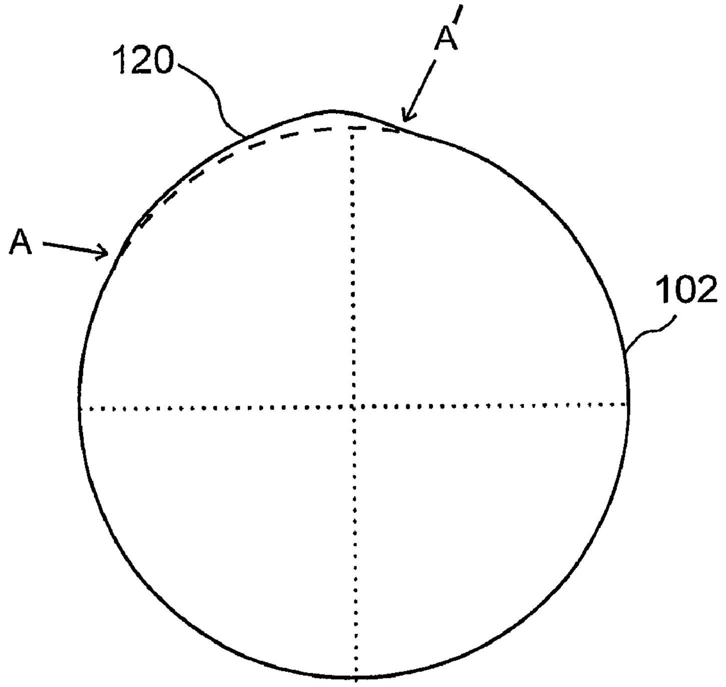
FIG. 4*d* shows an enlarged cross sectional view of an inner electrode having an asymmetric modified portion.

As was alluded to above, the first, second, and third operating positions are preferably three examples selected from a continuum of different operating positions. For instance, a distance between the modified portion 120 and the outlet plate 121 decreases continuously as the inner electrode 102 is turned in a counter clock-wise direction, beginning at the first operating position and ending at the third operating condition. Optionally, the counter clock-wise rotation of the inner electrode is stopped at any point intermediate the first and third operating positions. As shown at FIG. 4*d*, the modified portion 120 of the inner electrode 102 is asymmetric. That is between point A and the point of maximum deviation the amount of deviation changes slowly as a function of circumferential distance relative to a rate of change between the point of maximum deviation and the point A'. In fact, preferably the modified portion returns to the circular path as rapidly as is possible between the point of maximum deviation and the point A'. Of course, sharp edges should be avoided along the modified portion 120 so as to reduce a risk of electrical discharges occurring between the inner electrode 102 and the outer electrode 104.

Figure 4E:
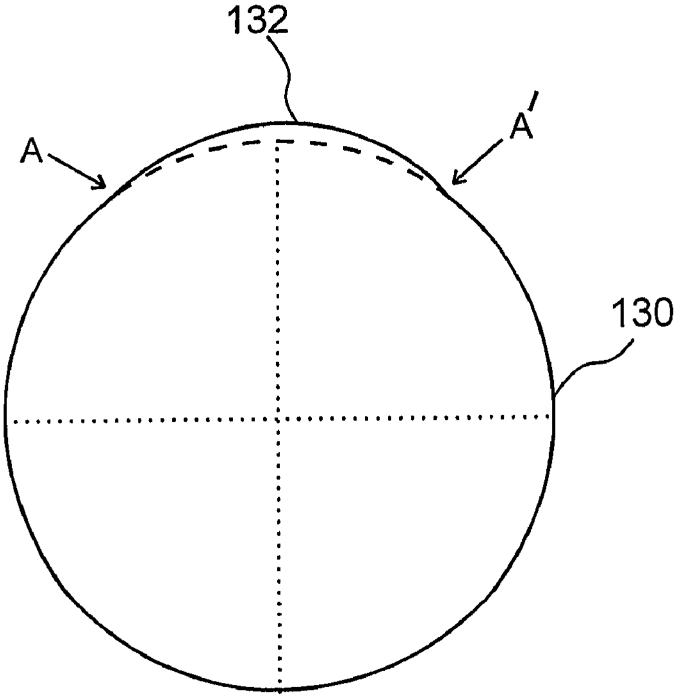
FIG. 4*e* shows an enlarged cross sectional view of an inner electrode having a symmetric modified portion.

Optionally, the device 100 has at least first and second discrete operating positions corresponding to the first operating position and the third operating position. In this optional embodiment shown in FIG. 4*e*, an inner electrode 130 is selectively switched between the two discrete operating positions. For example, when ions of a protein or another high molecular weight species are to be analyzer, the device 100 is switched to the first discrete operating position. A modified portion 132 is "parked" out of the way in a portion of the device through which ions are not selectively transmitted. Thus, the device 100 may be optimized for extracting high molecular weight ions. When low molecular ions are to be analyzed, the device is selectively switched to the second discrete operating position. In the second discrete operating position, the point of maximum deviation of the modified portion 132 is aligned with the orifice 123 through the outlet plate 121. Preferably, the modified portion 132 is symmetrical in this optional embodiment as shown at FIG. 4*e*, such that an electrode configuration similar to the one shown at FIG. 1*b* is provided when the device 100 is in the second discrete operating position. Advantageously, a same device 100 may be optimized for extracting both high and low molecular weight ions without removal and or replacement of components of the device 100. The rotation of the inner electrode 130 is performed optionally in one of a manual and an automated fashion. In either case, preferably there is provision for coarse and time adjustment of the rotational position of the inner electrode 130, to accommodate both switching between different discrete operating positions and timing after a discrete position is achieved.

Figure 5B:
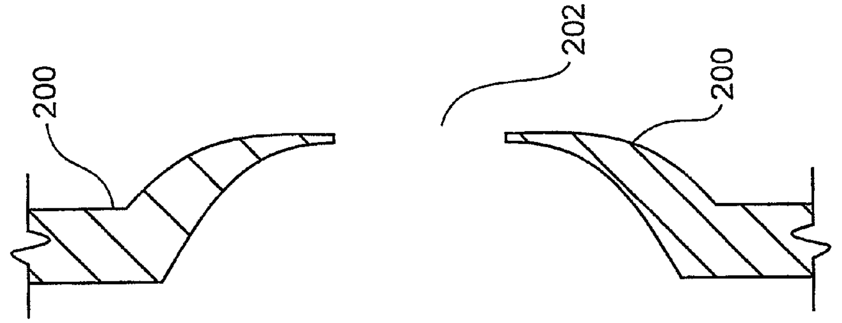
FIG. 5*b* is an enlarged view of the protruding ion outlet of the domed-FAIMS outer electrode shown at FIG. 5*a;*
Figure 5A:
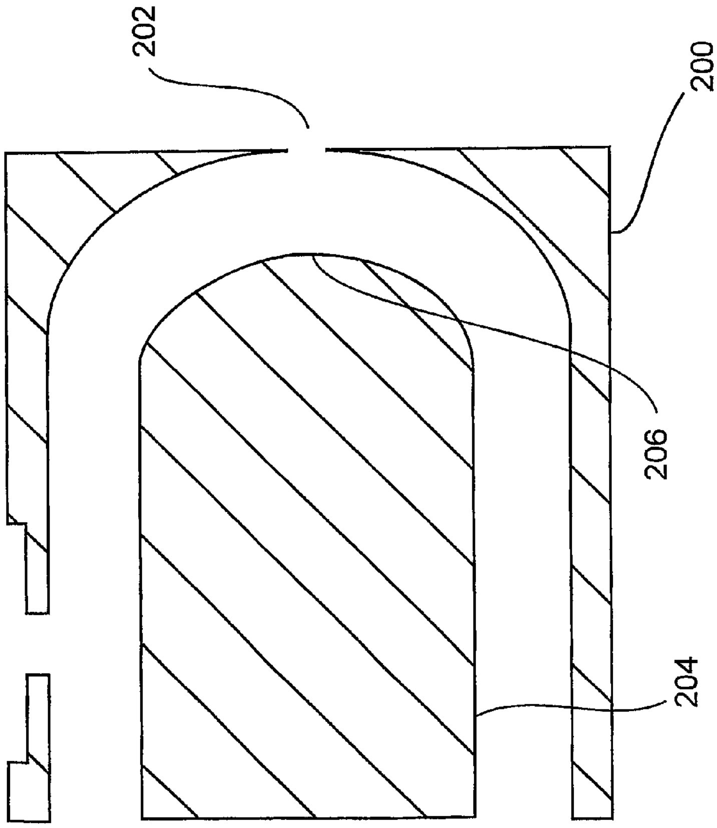
FIG. 5*a* is a simplified side cross sectional view of a domed-FAIMS outer electrode having a protruding ion outlet.

Referring now to FIG. 5*a*, shown is a simplified side cross sectional view of a domed-FAIMS outer electrode having a protruding ion outlet according to the instant invention. The outer electrode 200 differs from that described in prior art in the region immediately surrounding an opening in the ion outlet. The flat surface of the prior art outer electrode at the ion outlet is replaced by a protruding conical ion outlet 202, which is shown in an enlarged view at FIG. 5*b*. There are at least three effects of having a protruding ion outlet 202 on the outer electrode 200. First, the dimensions within the extraction region are changed relative to the prior art, thereby causing an ion to experience a different electric field in the extraction region of a FAIMS device having an outer electrode similar to the one shown at FIG. 5*a*. By slightly extending the outer electrode away from an inner electrode 204, the electric fields immediately between the spherical tipped end 206 of the inner electrode 204 and the protruding ion outlet 202 are modified, especially very close to the ion outlet 202. Second, the contact between the outer electrode 200 and a not illustrated orifice plate of a not illustrated mass spectrometer is also modified, which likely alters the efficiency of ion transport into the mass spectrometer. Finally, the protruding, volcano-shaped distortion at the outlet 202 changes the relative velocity of the gas flows in the region near the outlet 202, and may help to allow the gas to reach high velocity in a smooth laminar fashion as the gas is pulled to the ion outlet 202 by the vacuum of the not illustrated mass spectrometer. This change in the geometry of the outer electrode 200 in the vicinity of the outer region has resulted in an unpredictable, and unforeseen analytical performance advantage compared with the prior art domed-FAIMS devices.

Figure 5C:
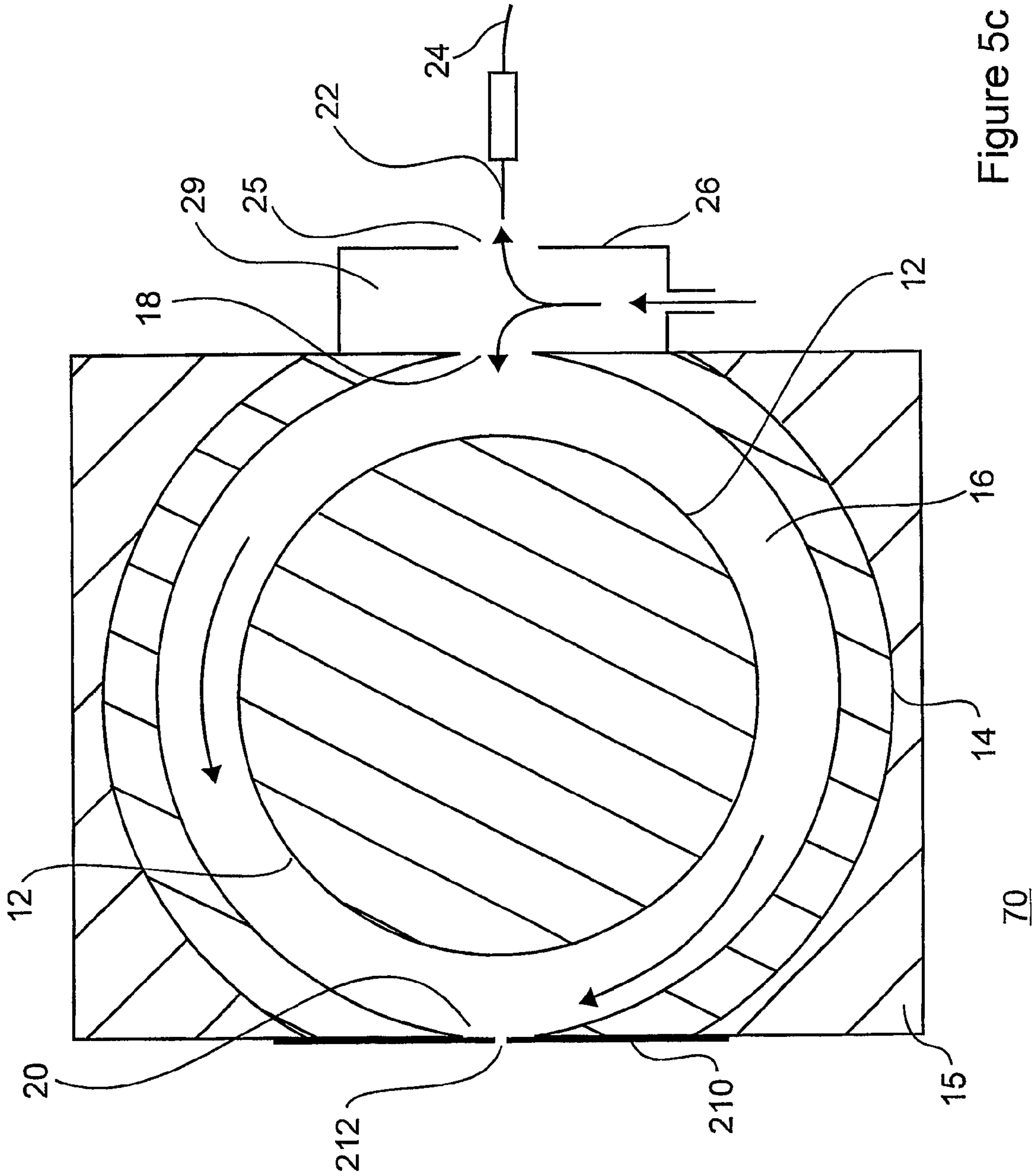
FIG. 5*c* is a simplified side cross sectional view of a side-to-side FAIMS having a protruding ion outlet according to the instant invention.
Figure 5D:
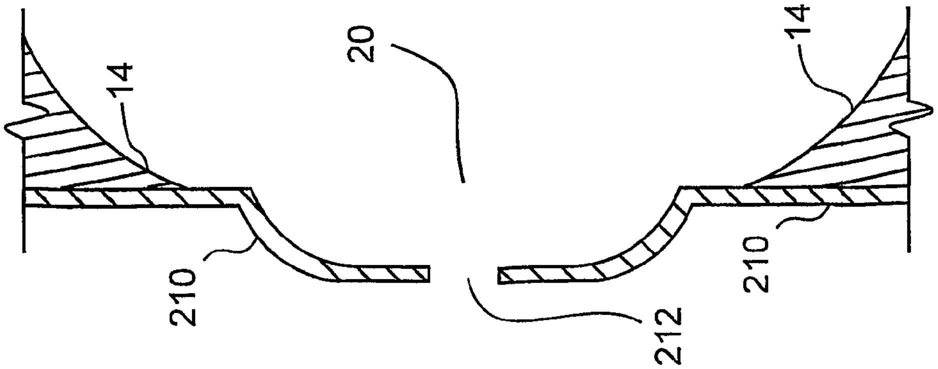
FIG. 5*d* is an enlarged view of the protruding ion outlet of the side-to-side FAIMS outer electrode shown at FIG. 5*c;*

Referring now to FIG. 5*c*, shown is a simplified side cross sectional view of a side-to-side FAIMS having a protruding ion outlet according to the instant invention. Elements labeled with the same numerals have the same function as those illustrated in FIG. 1*a*. The outlet plate 210 differs from that described in prior art in the region immediately surrounding an orifice 212 in the outlet plate 210. The flat surface of the prior art outlet plate orifice 23 is replaced by a protruding conical orifice 212, which is shown in an enlarged view at FIG. 5*d*.

Figure 6:
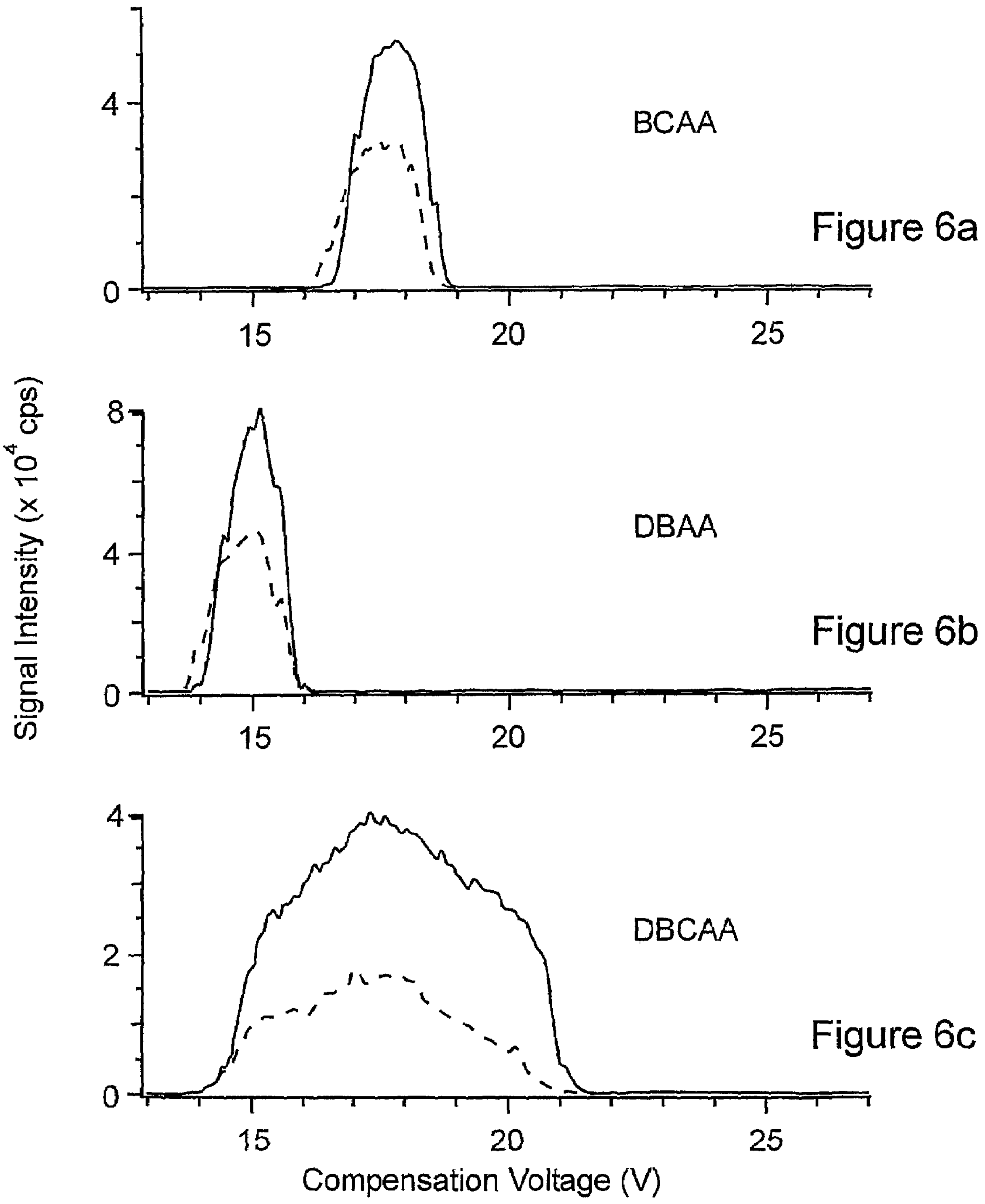
FIG. 6*a* is a CV spectrum for BCAA obtained using a prior art FAIMS (dotted line) and a FAIMS having an outer electrode having a protruding ion outlet (solid line)
FIG. 6*b* is a CV spectrum for DBAA obtained using a prior art FAIMS (dotted line) and a FAIMS having an outer electrode having a protruding ion outlet (solid line)
FIG. 6*c* is a CV spectrum for DBCAA obtained using a prior art FAIMS (dotted line) and a FAIMS having an outer electrode having a protruding ion outlet (solid line); and, FIG. 7 is a simplified flow diagram for a method of separating ions according to the instant invention.

Referring now to FIG. 6*a*, shown is a CV spectrum for the anions of bromochloroacetic acid (BCAA) obtained using a prior art FAIMS (dotted line) and a FAIMS including an outer electrode having a protruding ion outlet according to the instant invention (solid line). The CV spectra shown in FIG. 6*a* were obtained using N1 mode with a carrier gas of 97:3 nitrogen/carbon dioxides and a DV of −3600 V. The use of an outer electrode having a protruding ion outlet results in a significant increase in ion intensity over the prior art outer electrode having a flat surface at the ion outlet. In particular, the observed increase in ion intensity is approximately 70% for $BCAA^-$, which has a mass-to-charge ratio of m/z=173.

FIG. 6*b* is a CV spectrum for dibromoacetic acid (DRAA) obtained using a prior art FAIMS (dotted line) and a FAIMS including an outer electrode having a protruding ion outlet according to the instant invention (solid line). The CV spectra shown in FIG. 6*b* were obtained using a N1 mode with a carrier gas of 97:3 nitrogen/carbon dioxide and a DV of −3600 V. The observed increase in ion intensity is also approximately 70% for $DBAA^-$, which has a mass-to-charge ratio of m/z=217.

FIG. 6*c* is a CV spectrum for dibromochloracetic acid (DBCAA) obtained using a prior art FAIMS (dotted line) and a FAIMS including an outer electrode having a protruding ion outlet according to the instant invention (solid line). The CV spectra shown in FIG. 6*c* were obtained using Ni mode with a carrier gas of 97:3 nitrogen/carbon dioxide and a DV of −3600 V. Although the peak for $DBCAA^-$, which has a mass-to-charge ratio of m/z=251, is broad compared to the peaks for either of $BCAA^-$ and $DBAA^-$, an improvement of approximately 2.5-fold was observed for the ion intensity using the electrode with the protruding ion outlet. The breadth of the $DBCAA^-$ peak possibly suggests the presence of more than one species in the CV spectrum.

Figure 7:
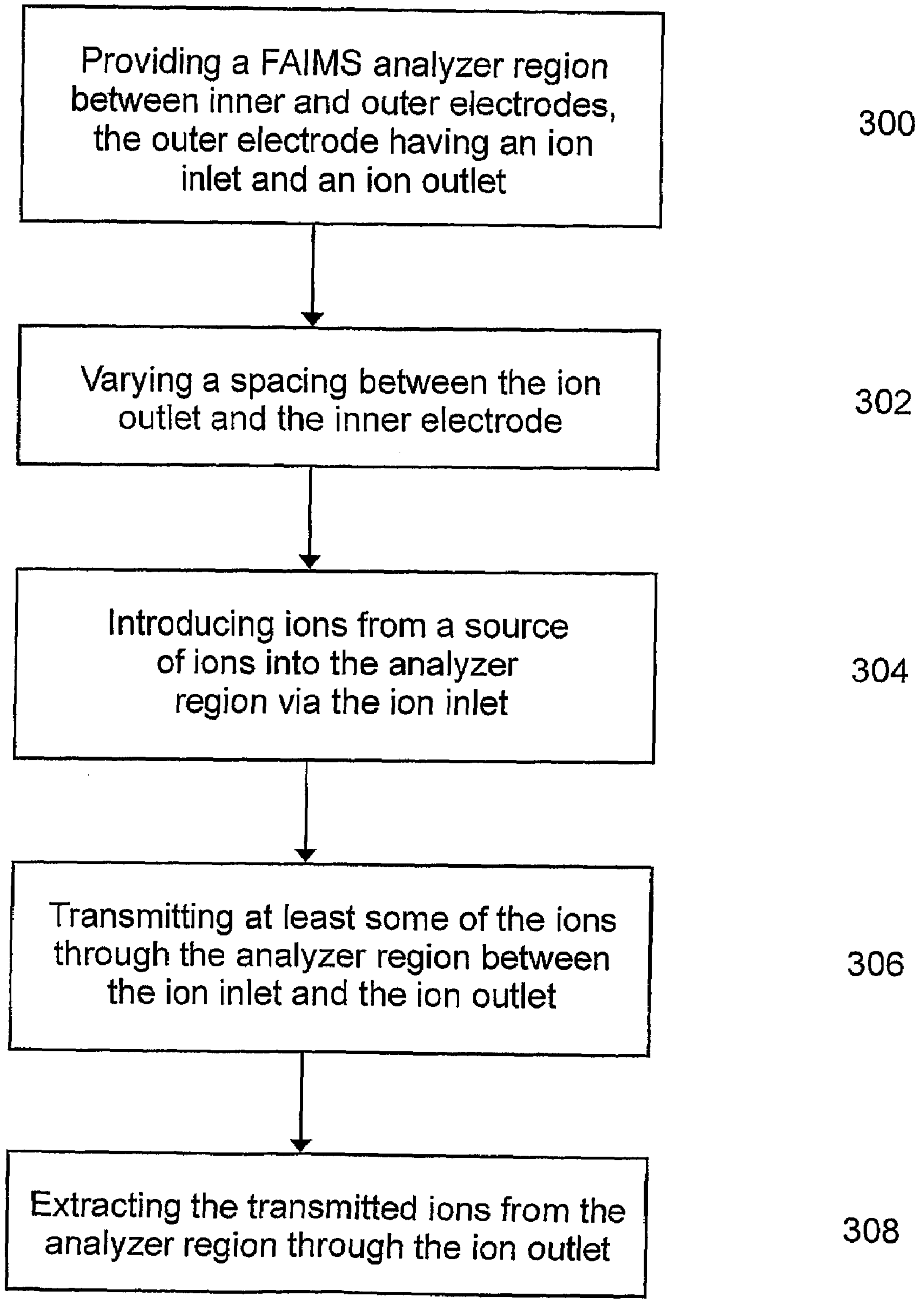

Referring now to FIG. 7, shown is a simplified flow diagram for a method of separating ions. At step 300 a FAIMS analyzer region having a side-to-side electrode geometry is provided, the analyzer region being disposed between an outer electrode and an inner electrode, and the outer electrode having an ion inlet and an ion outlet. At step 302 a spacing between the ion outlet and the inner electrode is varied For example, the inner electrode 102 of the FAIMS apparatus 100 is rotated relative to the outer electrode 104, so as to position the modified portion 120 of the inner electrode 102 in a spaced-apart facing arrangement with the ion outlet 112. At step 304, ions from a source of ions are introduced into the analyzer region via the ion inlet, where they become entrained in a flow of a carrier gas. At step 306, the ions are transmitted by the flow of a carrier gas through the analyzer region between the ion inlet and the ion outlet. Only those ions having appropriate high field mobility properties are transmitted to the ion outlet at a given combination of an applied asymmetric waveform and an applied compensation voltage. At step 308, the transmitted ions are extracted from the analyzer region through the ion outlet. Optionally, the extracted ions are subjected to one of further separation and detection. Further optionally, the spacing between the ion outlet and the inner electrode is further optimized, or tuned, so as to improve an efficiency of extracting the ions from the analyzer region through the ion outlet. For example the inner electrode 102 is adjusted alternately in a clockwise and a counter-clockwise direction whilst the intensity of an ion signal is monitored. When the monitored intensity is approximately maximized, then the spacing for approximately maximizing the ion transmission efficiency is optimized.

Numerous other embodiments may be envisaged without departing from the spirit and scope of the invention.

What is claimed is:

1. A high field asymmetric waveform ion mobility spectrometer having a side-to-side electrode geometry, comprising:

an inner electrode having a length and an outer surface that is curved in a direction transverse to the length; and, an outer electrode having a length and a curved inner surface, a portion of the length of the outer electrode overlapping a portion of the length of the inner electrode so as to provide an analyzer region therebetween, the outer electrode including an ion inlet for introducing ions from a source of ions into the analyzer region and an ion outlet for extracting ions from the analyzer region, the ion inlet and the ion outlet disposed on opposing sides of the outer electrode, Characterized in that:

at least one of the inner and outer electrodes is shaped such that a width of the analyzer region in the vicinity of the ion outlet is other than a width of the analyzer region in at least one other region.

2. A high field asymmetric waveform ion mobility spectrometer having a side-to-side electrode geometry according to claim 1 wherein the width of the analyzer region in the vicinity of the ion outlet is shorter than a width of the analyzer region in at least one other region.

3. A high field asymmetric waveform ion mobility spectrometer having a side-to-side electrode geometry according to claim 1, wherein the outer surface of the inner electrode is generally circular along a first portion of the outer surface in a cross-section taken in a plane normal to the length, and is distorted from circular along a second portion of the outer surface.

4. A high field asymmetric waveform ion mobility spectrometer having a side-to-side electrode geometry according to claim 1, comprising an electrical controller for applying an asymmetric waveform voltage to at least one of the inner electrode and outer electrode and for applying a direct current compensation voltage to at lease one of the inner electrode and outer electrode.

5. A high field asymmetric waveform ion mobility spectrometer having a side-to-side electrode geometry according to claim 3, comprising a mechanism for rotating the inner electrode relative to the outer electrode.

6. A high field asymmetric waveform ion mobility spectrometer having a side-to-side electrode geometry according to claim 5, wherein the mechanism is for rotating the inner electrode relative to the outer electrode so as to adjustably vary the width of the analyzer region in the vicinity of the ion outlet.

7. A high field asymmetric waveform ion mobility spectrometer having a side-to-side electrode geometry according to claim 1, comprising a gas flow barrier for barring a flow of a gas through a portion of the analyzer region intermediate the gas flow barrier and the ion outlet.

8. A high field asymmetric waveform ion mobility spectrometer having a side-to-side electrode geometry according to claim 5, comprising a gas flow barrier for barring a flow of a gas through a portion of the analyzer region intermediate the gas flow barrier and the ion outlet.

9. A high field asymmetric waveform ion mobility spectrometer having a side-to-side electrode geometry according to claim 8, wherein the inner electrode is rotatable between a first operating position and a second operating position, the second portion of the outer surface disposed in a spaced-apart facing arrangement with the ion outlet when the inner electrode is in the first operating position, and the second portion of the outer surface disposed within the portion of the analyzer region when the inner electrode is in the second operating position.

10. A high field asymmetric waveform ion mobility spectrometer having a side-to-side electrode geometry according to claim 8, comprising a gas inlet defined within the curved inner surface of the outer electrode, the gas inlet disposed intermediate the gas flow barrier and the ion inlet for providing a flow of a gas into the analyzer region and out of the ion outlet.

11. A high field asymmetric waveform ion mobility spectrometer having a side-to-side electrode geometry according to claim 3, wherein the inner electrode is fixedly mounted relative to the outer electrode, the second portion of the outer surface disposed in a spaced-apart facing arrangement with the ion outlet.

12. A high field asymmetric waveform ion mobility spectrometer having a side-to-side electrode geometry according to claim 1, comprising a mechanism for relatively moving the inner and outer electrodes.

13. A high field asymmetric waveform ion mobility spectrometer having a side-to-side electrode geometry according to claim 12, wherein the mechanism is for relatively moving the inner electrode with a translational motion from a first position to a second position nearer the ion outlet.

14. A high field asymmetric waveform ion mobility spectrometer having a side-to-side electrode geometry according to claim 1, wherein the inner surface of the outer electrode has a truncated curved shape with a truncated side, the truncated side having portions thereof spaced substantially closer to the inner electrode than the curved portion of the truncated curved surface.

15. A high field asymmetric waveform ion mobility spectrometer having a side-to-side electrode geometry according to claim 3, wherein the second portion of the outer surface is disposed in a spaced-apart facing arrangement with the ion outlet, the spaced-apart facing arrangement being other than adjustable.

16. A high-field asymmetric waveform ion mobility spectrometer having a side-to-side electrode geometry according to claim 7, wherein the inner and outer electrodes are supported one relative to the other in an electrically insulating material, and wherein the gas flow barrier comprises a protrusion of the electrically insulating material.

17. A high field asymmetric waveform ion mobility spectrometer having a side-to-side electrode geometry according to claim 16, wherein the protrusion forms an approximately gas-tight seal with the outer surface of the inner electrode.

18. A high field asymmetric waveform ion mobility spectrometer having a side-to-side electrode geometry, comprising:

an outer electrode having a length and an inner surface that is curved in a direction transverse to the length, the outer electrode including an ion inlet within a first portion of the inner surface and an ion outlet within a second portion of the inner surface that is opposite the first portion of the inner surface; and, an eccentric inner electrode rotatably mounted in a spaced-apart arrangement with the outer electrode and defining an analyzer region therebetween, the inner electrode rotatable between a first position for providing a first width of the analyzer region in the vicinity of the ion outlet and a second position for providing a second width of the analyzer region in the vicinity of the ion outlet, the second width shorter than the first width.

19. A high field asymmetric waveform ion mobility spectrometer having a side-to-side electrode geometry according to claim 18, comprising a gas flow barrier disposed intermediate the ion inlet and the ion outlet for barring a flow of a gas in one direction around the inner electrode.

20. A high field asymmetric waveform ion mobility spectrometer having a side-to-side electrode geometry according to claim 19, comprising a mechanism for selectively switching the inner electrode between the first and second positions.

21. A high field asymmetric waveform ion mobility spectrometer having a side-to-side electrode geometry according to claim 19, comprising a mechanism for selectively rotating the inner electrode to vary approximately continuously the width of the analyzer region in the vicinity of the ion outlet.

22. A method for separating ions, the method comprising the steps of:

providing a FAIMS analyzer region having a side-to-side geometry, the analyzer region disposed between an outer electrode and an inner electrode, the outer electrode having an ion inlet and an ion outlet, a radial distance between the ion outlet and an outer surface of the inner electrode being other than a radial distance between an inner surface of the outer electrode and the outer surface of the inner electrode in a region away from the ion outlet;

introducing ions from a source of ions into the analyzer region via the ion inlet;

transmitting at least some of the ions through the analyzer region between the ion inlet and the ion outlet at a given combination of an applied asymmetric waveform and an applied compensation voltage; and, extracting the transmitted ions from the analyzer region through the ion outlet.

23. A method according to claim 22, wherein the radial distance between the ion outlet and the outer surface of the inner electrode is smaller than the radial distance between the inner surface of the outer electrode and the outer surface of the inner electrode in the region far away from the ion outlet.

24. A method of separating ions, the method comprising the steps of:

providing a FAIMS analyzer region having a side-to-side geometry, the analyzer region disposed between an outer electrode and an inner electrode, the outer electrode having an ion inlet and an ion outlet;

varying a spacing between the ion outlet and the inner electrode;

introducing ions from a source of ions into the analyzer region via the ion inlet;

transmitting at least some of the ions through the analyzer region between the ion inlet and the ion outlet at a given combination of an applied asymmetric waveform and an applied compensation voltage; and, extracting the transmitted ions from the analyzer region through the ion outlet.

25. A method according to claim 24, wherein the spacing is varied so as to increase an efficiency in the step of extracting ions from the analyzer region.

26. A method according to any claim 24, wherein the spacing is varied such that a radial distance between the ion outlet and an outer surface of the inner electrode is smaller than a radial distance between an inner surface of the outer electrode and the outer surface of the inner electrode in a region away from the ion outlet.

27. A method according to claim 25, wherein the step of varying a space between the ion outlet and the inner electrode comprises a step of rotating the inner electrode relative to the outer electrode.

28. A method according to claim 25, comprising the step of directing ions around the inner electrode in one direction only.

29. A method according to claim 25, wherein the step of varying a space between the ion outlet and the inner electrode comprises a step of relatively moving the inner electrode toward the outer electrode.

30. A high field asymmetric waveform ion mobility spectrometer comprising:

an inner electrode having a length and a curved outer surface; and, an outer electrode having a length, a channel extending therethrough along at least a portion of the length, and a curved inner surface, a portion of the length of the outer electrode overlapping a portion of the length of the inner electrode so as to provide an analyzer region therebetween, the outer electrode defining an ion inlet and an ion outlet, the ion outlet disposed in a spaced-apart facing arrangement with a portion of the curved outer surface of the inner electrode, the ion outlet recessed within the curved inner surface of the outer electrode, such that a spacing between the portion of the curved outer surface and the ion outlet is longer than a spacing between a different portion of the curved outer surface and the curved inner surface of the outer electrode in a region away from the ion outlet.

31. A high field asymmetric waveform ion mobility spectrometer according to claim 30, comprising an electrical controller for applying an asymmetric waveform voltage to at least one of the inner electrode and outer electrode and for applying a direct current compensation voltage to at least one of the inner electrode and outer electrode.

32. A high field asymmetric waveform ion mobility spectrometer having a side-to-side electrode geometry according to claim 2, wherein the outer surface of the inner electrode is generally circular along a first portion of the outer surface in a cross-section taken in a plane normal to the length, and is distorted from circular along a second portion of the outer surface.

* * * * *

UNITED STATES PATENT AND TRADEMARK OFFICE

CERTIFICATE OF CORRECTION

PATENT NO. : 7,223,967 B2 
APPLICATION NO. : 10/503656
DATED : May 29, 2007
INVENTOR(S) : Guevremont et al.

It is certified that error appears in the above-identified patent and that said Letters Patent is hereby corrected as shown below:

Column 18, claim 23, line 13
“region far away from ion” should be --region away from ion--

Signed and Sealed this

Twenty-seventh Day of November, 2007

JON W. DUDAS
*Director of the United States Patent and Trademark Office*